United States Patent
Sato

(10) Patent No.: US 7,676,338 B2
(45) Date of Patent: Mar. 9, 2010

(54) METHOD FOR DETECTING ABNORMALITY OF TEMPERATURE SENSOR IN MACHINE TOOL

(75) Inventor: Reiji Sato, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 11/946,356

(22) Filed: Nov. 28, 2007

(65) Prior Publication Data

US 2008/0136402 A1 Jun. 12, 2008

(30) Foreign Application Priority Data

Dec. 11, 2006 (JP) .............................. 2006-333761

(51) Int. Cl.
G01K 15/00 (2006.01)
G01F 1/20 (2006.01)

(52) U.S. Cl. .................. 702/99; 702/100; 702/101; 702/102

(58) Field of Classification Search ........... 702/99–102, 702/130
See application file for complete search history.

(56) References Cited

FOREIGN PATENT DOCUMENTS

| JP | 61-059860 B2 | 12/1986 |
| JP | 06-061674 B2 | 8/1994 |
| JP | 2001-341049 A1 * | 12/2001 |

* cited by examiner

Primary Examiner—Eliseo Ramos Feliciano
Assistant Examiner—Phuong Huynh
(74) Attorney, Agent, or Firm—Burr & Brown

(57) ABSTRACT

The invention enables an abnormality of a temperature sensor to be simply detected. In S1, a temperature measurement is performed with each temperature sensor, and measured signals are digitalized to obtain a temperature value. Then, in S2, a detection temperature Tb' equivalent to a detected temperature of a corresponding temperature sensor is calculated with use of an arithmetic expression and a characterization factor stored in a parameter storage device, and in S3, an absolute value $\Delta T$ of a temperature difference between Ta and Tb' is obtained. Subsequently, in S4, the calculated absolute value $\Delta T$ is compared with a limit value $\gamma$, and when $\Delta T$ is larger than the limit value $\gamma$, Ta or Tb is determined to be abnormal and an alert is issued with an alarm or the like in S5, followed by issuance of a command to a correcting device in S6 not to change a correction amount set before the abnormality occurs.

2 Claims, 5 Drawing Sheets

Flow chart of the present invention

[Fig. 1]
Configuration diagram of the present invention
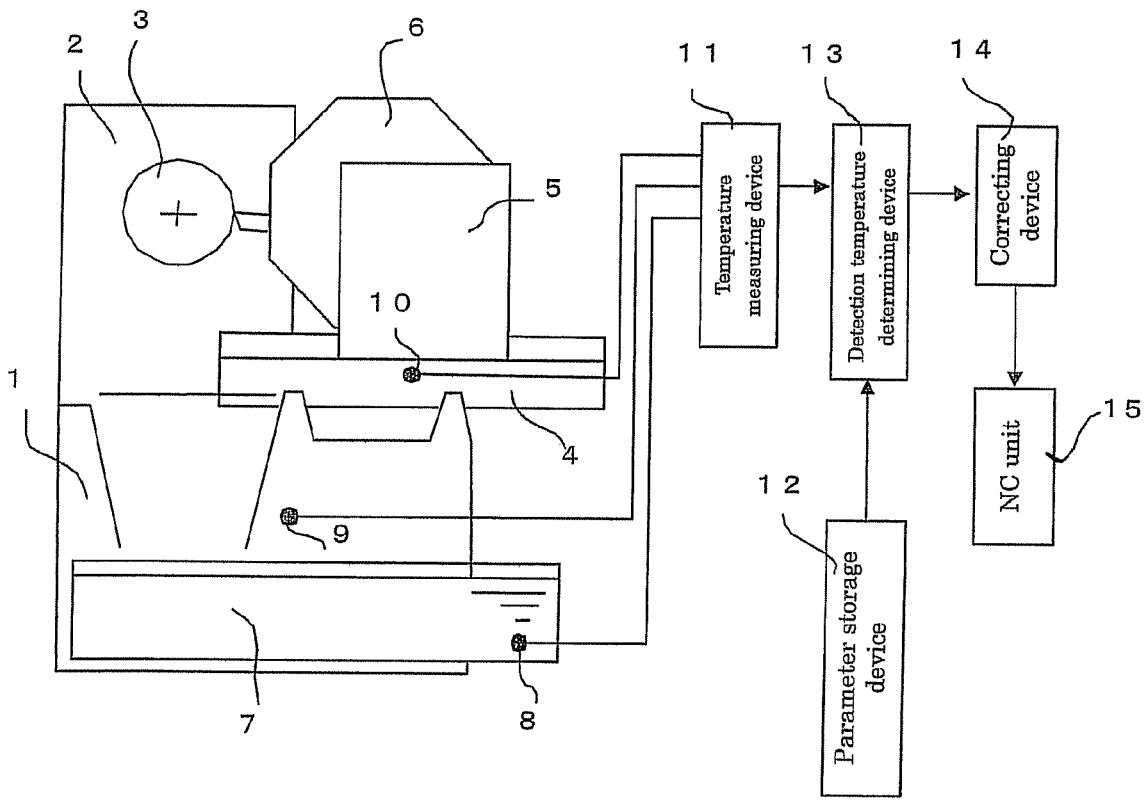

[Fig. 2]
Variations in detection temperatures of temperature sensors (for a case of a room temperature variation in Fig. 3)
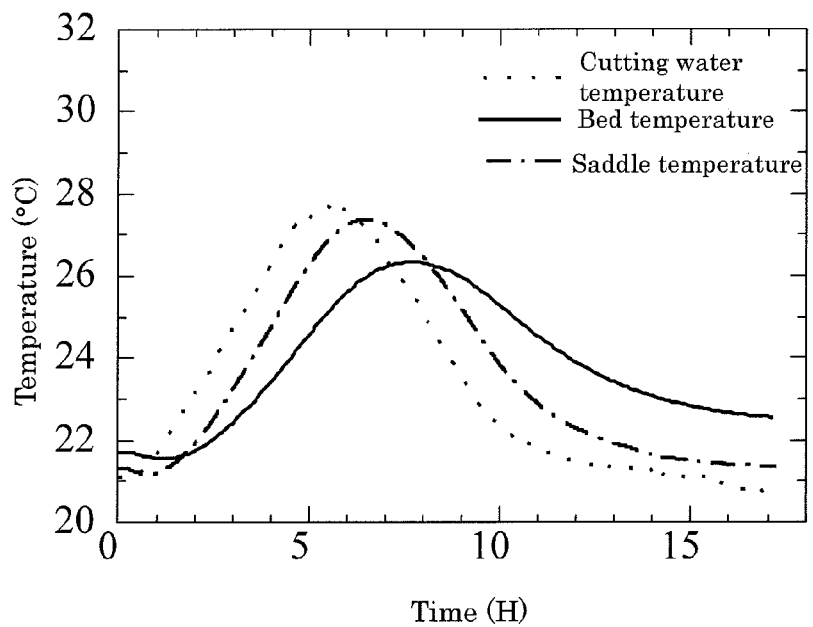
[Fig. 3]
Room temperature variation
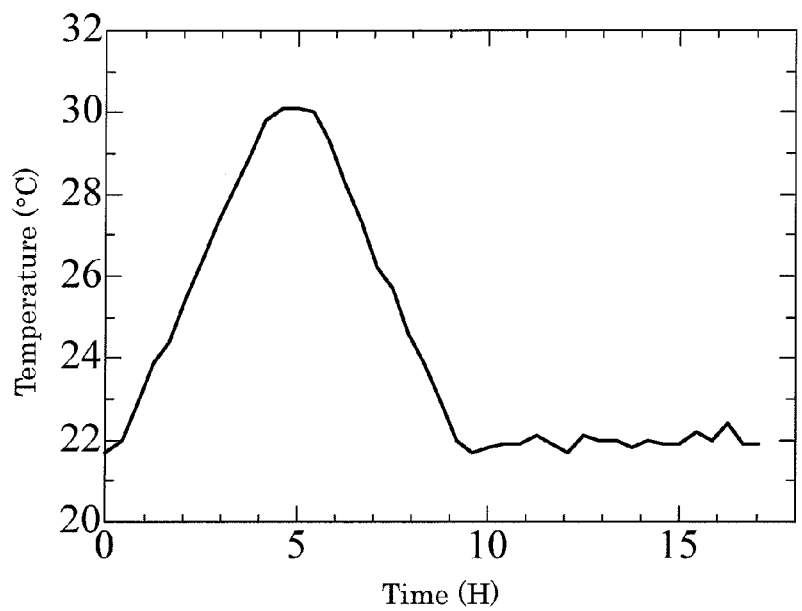

[Fig.4]
Comparison of saddle temperature with temperature $Tb_{8\text{-}10}'$ that is equivalent to saddle temperature and calculated from cutting water temperature
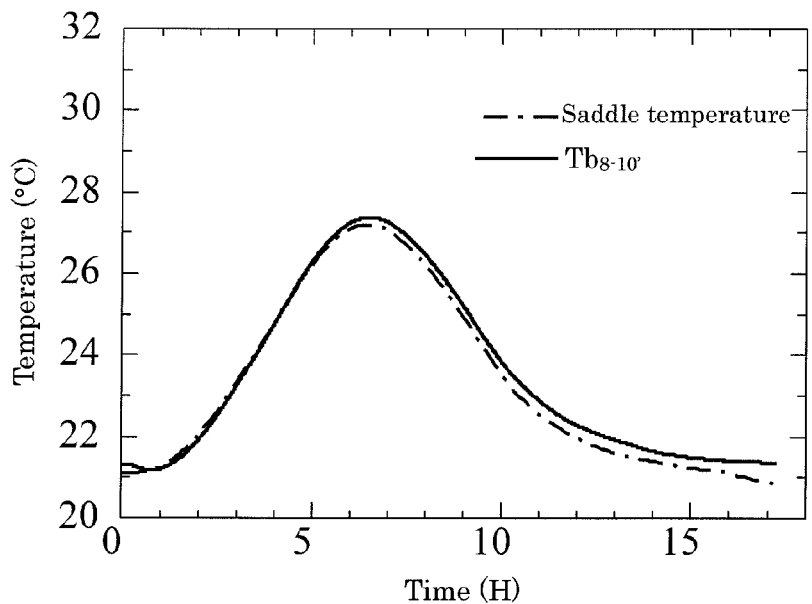
[Fig.5]
Comparison of cutting water temperature with temperature $Tb_{9\text{-}8}'$ that is equivalent to cutting water temperature and calculated from bed temperature
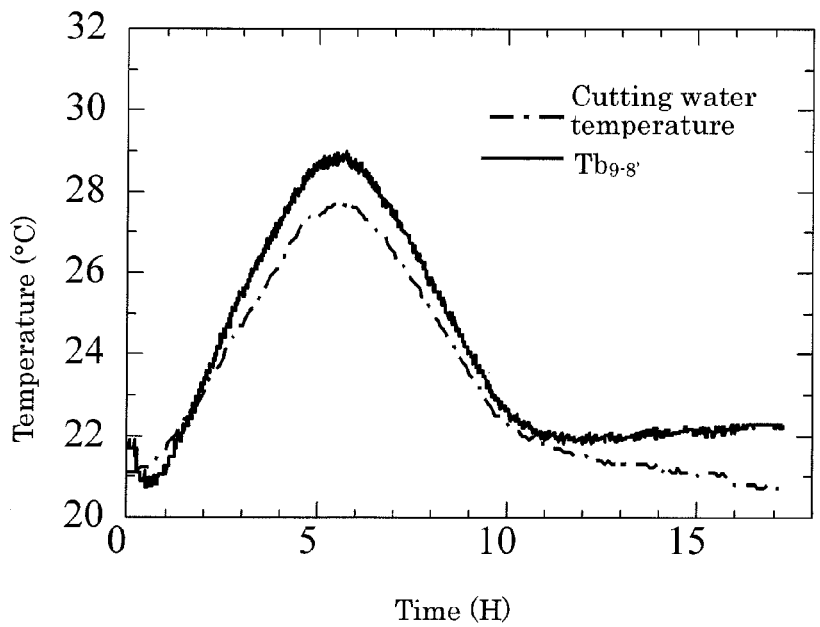

[Fig.6]
Comparison of bed temperature with temperature $Tb_{10\text{-}9}'$ that is equivalent to bed temperature and calculated from saddle temperature
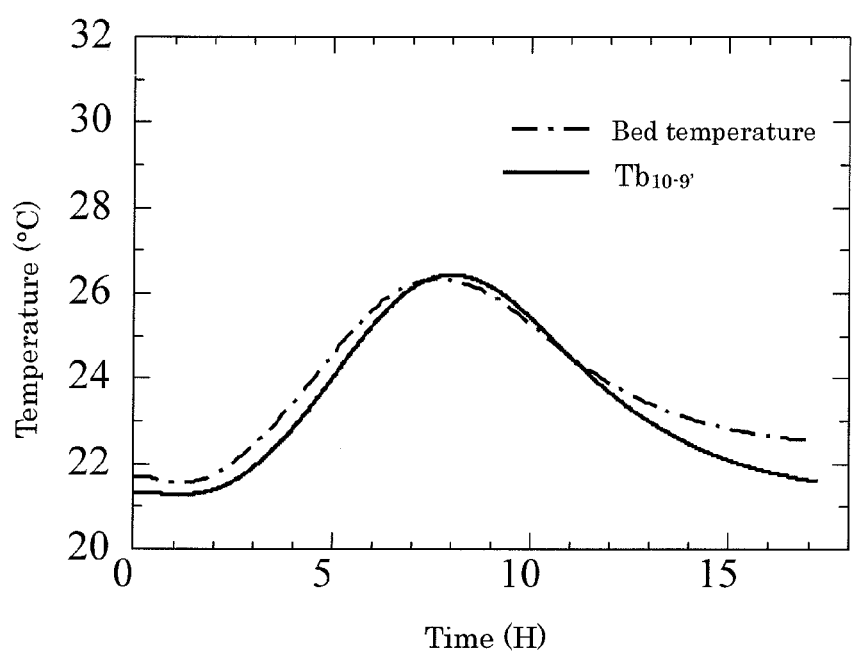

[Fig.7]
Flow chart of the present invention
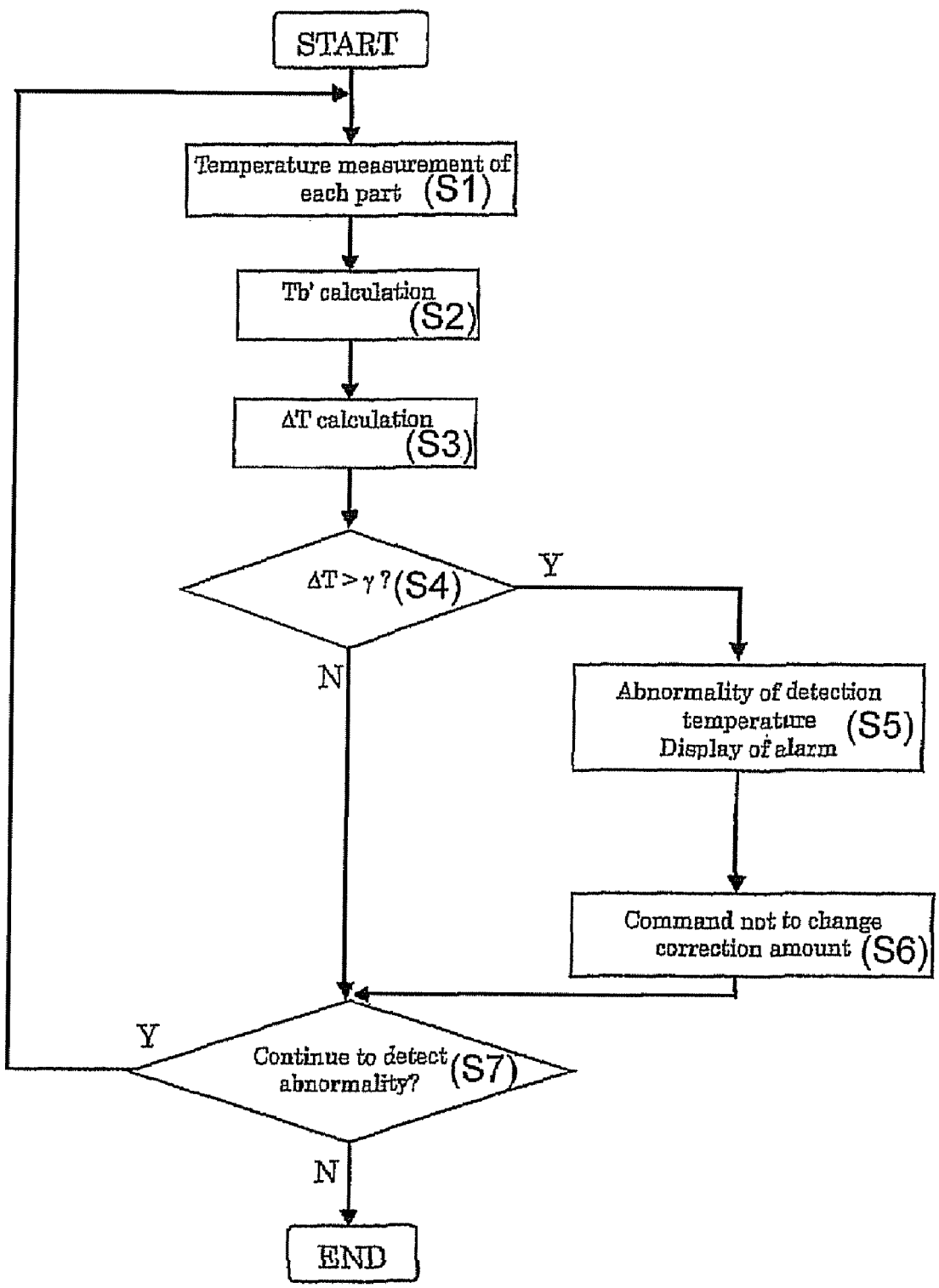

METHOD FOR DETECTING ABNORMALITY OF TEMPERATURE SENSOR IN MACHINE TOOL

This application claims the benefit of Japanese Patent Application Number 2006-333761 filed Dec. 11, 2006 the entirety of which is incorporated by reference.

BACKGROUND OF THE INVENTION

1. Field of the Invention

The present invention relates to a method for detecting an abnormality of a temperature sensor used for correcting thermal displacement of a machine tool.

2. Description of the Background Art

In a machine tool, a thermal displacement correcting method for correcting a machining dimensional error caused by surrounding room temperature variation or cutting heat is often used. The method is configured where a temperature sensor such as a thermocouple or thermistor is provided on each of components of the machine tool, temperature information from the temperature sensor is obtained by means of a temperature measuring device such as a voltmeter or ammeter, a thermal displacement amount is estimated from the obtained temperature information to calculate a correction amount for a moving body such as a main spindle or tool rest, and the moving body is controlled based on the correction amount (see Patent documents 1 to 3).

Patent document 1: Japanese Patent Publication No. 1986-59860

Patent document 2: Japanese Patent Publication No. 1994-61674

Patent document 3: Japanese Unexamined Patent Publication No. 2001-341049

SUMMARY OF THE INVENTION

In the above-mentioned conventional method, when an abnormal temperature due to disconnection or short circuit in the temperature sensor, or failure of the temperature measuring device is detected, a normal correction may not be performed and the machining dimensional error may increase. Further, the moving body of the machine may collide with a workpiece due to an abnormal correction amount, so that the abnormality of the temperature sensor should be detected. The abnormality of the temperature sensor, such as disconnection or short circuit, can easily be detected by monitoring the temperature information from each of the temperature sensors. However, the abnormality or like due to age deterioration of the thermistor cannot be detected solely by the temperature sensor or the temperature measuring device, and therefore there has been employed a method in which a plurality of temperature sensors are arranged at the same place, and the abnormality is detected by comparing a plurality of pieces of temperature information with one another. For this reason, the number of temperature sensors or temperature measuring devices increases, resulting in an increase in cost.

An object of the present invention is to provide a method for more simply detecting the abnormality of the temperature sensor.

In order to accomplish the above object, an invention according to a first aspect comprises the steps of: obtaining a detection temperature equivalent to a detected temperature of any one of temperature sensors based on a preset arithmetic expression with use of said one of the temperature sensors; comparing a difference between the obtained equivalent detection temperature and the detected temperature of one of the temperature sensors with a preset limit value; and when the difference exceeds said limit value, determining said one of the temperature sensors or the other temperature sensor to be abnormal.

An invention of a second aspect is, in addition to the object mentioned above, configured to use a transfer function of a primary delay system for the arithmetic expression in order to simply and accurately obtain the equivalent detection temperature.

According to the present invention, the determination of the abnormality of the detected temperature becomes possible only with a temperature sensor used for a correction and a temperature measuring device. Accordingly, it is not necessary to use extra temperature sensors and temperature measuring devices, and the detection of the abnormality of the detected temperature can be simply performed without taking extra time, resulting in reduction of the cost.

The invention according to the second aspect enables to obtain a value of the equivalent detection temperature simply and accurately.

BRIEF DESCRIPTION OF THE DRAWINGS

FIG. 1 is a schematic diagram of a lathe;

FIG. 2 is a graph illustrating variations of detected temperatures of temperature sensors;

FIG. 3 is a graph illustrating a variation of room temperature;

FIG. 4 is a graph in which a saddle temperature and a temperature $Tb_{8\text{-}10}'$ are compared with each other;

FIG. 5 is a graph in which a cutting water temperature and a temperature $Tb_{9\text{-}8}'$ are compared with each other;

FIG. 6 is a graph in which a bed temperature and a temperature $Tb_{10\text{-}9}'$ are compared with each other; and FIG. 7 is a flowchart of a method for detecting an abnormality of a temperature sensor.

DETAILED DESCRIPTION OF THE INVENTION

An embodiment of the present invention will hereinafter be described based on the drawings.

FIG. 1 is a schematic diagram of a lathe as one example of a machine tool as viewed from an axial direction of a main spindle. A main spindle stock 2 is securely installed on a left-hand upper surface of a bed 1, and a chuck 3 is also securely installed on the main spindle projected from the main spindle stock 2 to enable a work to be held. A saddle 4 is placed on a rail provided on an upper surface of the bed 1 on a right-hand side of the main spindle stock 2, and on the saddle 4, a tool rest 5 is slidable in a radial direction of the main spindle so as to fix a cutting tool onto an outer peripheral surface of a turret 6 which is rotatable on a side surface of the tool rest 5.

The bed 1 under the main spindle stock 2 has a hole for discharging chips and cutting water, and the discharged chips and cutting water are recovered into a cutting water tank 7.

Further, the lathe is provided with three temperature sensors 8 to 10. The temperature sensor 8 is attached to the cutting water tank 7 to measure a temperature of the cutting water, the temperature sensor 9 is attached to the bed 1 to measure a bed temperature of the machine body, and the temperature sensor 10 is attached to the saddle 4 to measure a saddle temperature, respectively.

Temperature detection signals from each of the temperature sensors 8 to 10 are input to a temperature measuring device 11, and then digitalized from the analog signals to a temperature value by means of a publicly-known method.

Reference numeral 12 represents a parameter storage device, in which an arithmetic expression is stored. The expression is based on a detected temperature Ta of one of the temperature sensors and a detected temperature Tb of the other temperature sensor at a different position, converting Tb into a detection temperature Tb' equivalent to Ta. A detection temperature determining device 13 obtains the detection temperature Tb' based on the arithmetic expression in the parameter storage device 12, and comparing a difference between the detected temperature Ta and the detection temperature Tb' with a preset limit value to determine an abnormality of the temperature sensor. Then the detection temperature determining device 13 outputs the determination result to a correcting device 14. The correcting device 14 calculates a correction value from the detection temperature obtained by the detection temperature determining device 13, and then outputs it to an NC unit 15. The NC unit 15 will change a feed command for the saddle, tool rest, or like in accordance with the obtained correction value.

A transfer function of a primary delay system expressed by the following formula 1 can be used as the arithmetic expression stored in the parameter storage device 12. However, when temperature variation of Tb is faster than that of Ta, the expression 1 is used in which the transfer function of a primary delay system is approximated by a discretized expression. On the other hand, when temperature variation of Ta is faster than that of Tb, the expression 2 is used.

[Formula 1]

$$Tb'_n = Tb'_{n-1} + (Tb_n - Tb'_{n-1}) \cdot \alpha \qquad \text{Expression 1}$$

$$Tb'_n = Tb_{n-1} + (Tb_n - Tb_{n-1}) \cdot 1/\beta \qquad \text{Expression 2}$$

Tb: Detected temperature of other temperature sensor
α: Characterization factor A
β: Characterization factor B
n: Number of times In the parameter storage device 12, characterization factors $\alpha_{8-10}$, $\beta_{9-8}$, and $\alpha_{10-9}$ between the respective temperature sensors 8 to 10, and the limit value γ are set as the characterization factors A and B respectively used for the above expressions 1 and 2, FIG. 2 illustrates the detected temperatures of the temperature sensor 8 at a cutting water tank, the temperature sensor 9 at a bed, and the temperature sensor 10 at a saddle, respectively, for a case where room temperature varies as illustrated in FIG. 3. The detected temperatures of the respective temperature sensors are different from one another depending on the attached position of the sensors as described above, so that the characterization factors of the detected temperatures between the respective temperature sensors are set as follows:

$\alpha_{8-10}$: Characterization factor A of temperature sensor 10 (saddle) with respect to temperature sensor 8 (cutting water) ($=2.8 \times 10^{-3}$)

$\beta_{9-8}$: Characterization factor B of temperature sensor 8 (cutting water) with respect to temperature sensor 9 (bed) ($=7.9 \times 10^{-4}$)

$\alpha_{10-9}$: Characterization factor A of temperature sensor 9 (bed) with respect to temperature sensor 10 (saddle) ($=1.5 \times 10^{-3}$)

A method for detecting an abnormality of a temperature sensor in the lathe, configured as above, is described based on a flowchart illustrated in FIG. 7.

Temperature measurements are first performed by means of the respective temperature sensors 8 to 10, and then obtained signals are digitalized by the temperature measuring device 11 to temperature values (S1). The digitalization of the obtained signals is performed at preset intervals (e.g., every 10 seconds). Subsequently, in S2, with use of the arithmetic expressions and characterization factors stored in the parameter storage device 12, the following detection temperatures $Tb_{8-10}'$, $Tb_{9-8}'$, and $Tb_{10-9}'$ equivalent to the temperatures of the corresponding temperature sensors are respectively calculated by the detection temperature determining device 13. Specifically, calculation is made with the following expressions 1a, 2a, and 1b shown in formula 2. FIGS. 4, 5 and 6 show results obtained by comparing $Tb_{8-10}'$, $Tb_{9-8}'$, and $Tb_{10-9}'$ with the corresponding detected temperatures respectively.

$Tb_{8-10}'$: Value equivalent to detected temperature of temperature sensor 10 (saddle), which is calculated from temperature sensor 8 (cutting water)

$Tb_{9-8}'$: Value equivalent to detected temperature of temperature sensor 8 (cutting water), which is calculated from temperature sensor 9 (bed)

$Tb_{10-9}'$: Value equivalent to detected temperature of temperature sensor 9 (bed), which is calculated from temperature sensor 10 (saddle)

[Formula 2]

$$Tb_{8-10}{}'_n = Tb_8{}'_{n-1} + (Tb_{8n} - Tb_8{}'_{n-1}) \cdot \alpha_{8-10} \qquad \text{Expression 1a}$$

$$Tb_{9-8}{}'_n = Tb9_{n-1} + (Tb_{9n} - Tb_{9n-1}) \cdot 1/\beta_{9-8} \qquad \text{Expression 2a}$$

$$Tb_{10-9}{}'_n = Tb_{10}{}'_{n-1} + (Tb_{10n} - Tb_{10}{}'_{n-1}) \cdot \alpha_{10-9} \qquad \text{Expression 1b}$$

$Tb_8$: Detected temperature of temperature sensor 8 (cutting water)
$Tb_9$: Detected temperature of temperature sensor 9 (bed)
$Tb_{10}$: Detected temperature of temperature sensor 10 (saddle)

Subsequently, in S3, an absolute value ΔT of the temperature difference between Ta and Tb' is obtained with the following expression 3 shown in formula 3 stored in the parameter storage device 12. Here, the absolute value ΔT of the temperature difference for a case where the abnormality is determined with use of $Tb_{8-10}'$, $Tb_{9-8}'$, or $Tb_{10-9}'$ calculated from the above expression 1a, 2a, or 1b is calculated based on the following expression 3a, 3b, or 3c.

[Formula 3]

$$\Delta T = |Ta - Tb'| \qquad \text{Expression 3}$$

$$\Delta T_{8-10} = |Ta_{10} - Tb_{8-10}'| \qquad \text{Expression 3a}$$

$$\Delta T_{9-8} = |Ta_8 - Tb_{9-8}'| \qquad \text{Expression 3b}$$

$$\Delta T_{10-9} = |Ta_9 - Tb_{10-9}'| \qquad \text{Expression 3c}$$

$Ta_8$: Detected temperature of temperature sensor 8 (cutting water)
$Ta_9$: Detected temperature of temperature sensor 9 (bed)
$Ta_{10}$: Detection temperature of temperature sensor 10 (saddle)

After that, in S4, the calculated absolute value ΔT is compared with the limit value γ. When ΔT is larger than the limit value γ, Ta or Tb is determined to be abnormal. Then an alert is issued with an alarm or like in S5, followed by issuance of a command to the correcting device 14 in S6 not to change a correction amount set before the abnormality occurs. If it is determined in a determination step of S7 that the abnormality detection is continuously performed, the flow returns to S1.

In addition, a different combination of temperature sensors is used for each ΔT in this example, so that one position where the detected temperature is abnormal can be identified based on the following expressions 4a, 4b, and 4c shown in formula 4.

[Formula 4]

$\Delta T_{8-10} > \gamma$ and $\Delta T_{9-8} > \gamma$: Detected temperature of temperature sensor 8 (cutting water) is determined to be abnormal (Expression 4a)

$\Delta T_{9-8} > \gamma$ and $\Delta T_{8-10} > \gamma$: Detected temperature of temperature sensor 9 (bed) is determined to be abnormal (Expression 4b)

$\Delta T_{10-9} > \gamma$ and $\Delta T_{8-10} > \gamma$: Detected temperature of temperature sensor 10 (saddle) is determined to be abnormal (Expression 4c)

As described above, according to the method for detecting an abnormality of a temperature sensor having the above configuration, the detection temperature equivalent to the detected temperature at any one of the temperature sensors is obtained based on the preset arithmetic expression with use of the detected temperature of the other temperature sensor at a position different from that of said one of the temperature sensors. Then the difference between the obtained equivalent detection temperature and the detected temperature of said one of the temperature sensors is compared with the preset limit value. When the difference exceeds the limit value, by determining said one of the temperature sensors or the other temperature sensor to be abnormal, determination of the abnormality of the detection temperature becomes possible only with the temperature sensor used for a correction and the temperature measuring device. Accordingly, it is not necessary to use extra temperature sensors and temperature measuring devices and the detection of the abnormality of the detected temperature can be simply performed without taking extra time, resulting in reduction of the cost. In particular, by using the above transfer function of a primary delay system for the arithmetic expression to obtain the equivalent detection temperature, a value of the equivalent detected temperature can be simply and accurately obtained.

In addition, the number, attachment positions, and the like of the temperature sensors are not limited to the above embodiment, but can be appropriately modified. It should also be appreciated that an applicable machine tool is not limited to the above embodiment. For example, it is applicable to a composite-machining machine such as a machining center where thermal displacement correction is performed by means of temperature sensors.

What is claimed is:

1. A method for detecting abnormalities of a plurality of temperature sensors in a machine tool in which the plurality of temperature sensors are arranged at different positions, the method comprising the steps of:

detecting a temperature of each position by the plurality of temperature sensors;

calculating an equivalent temperature which is equivalent to the detected temperature of one of the temperature sensors based on a preset arithmetic expression with use of a detected temperature of another temperature sensor arranged at a position different from that of said one of the temperature sensors;

subtracting the detected temperature of said one of the temperature sensors from the equivalent temperature;

comparing a difference value from the subtraction operation with a preset limit value; and when the difference value exceeds the limit value, determining said one of the temperature sensors or said another temperature sensor to be abnormal.

2. The method for detecting abnormalities of temperature sensors in the machine tool according to claim 1, wherein a transfer function of a primary delay system is used for the arithmetic expression.

\* \* \* \* \*